United States Patent [19]

Smith

[11] Patent Number: 5,186,272
[45] Date of Patent: Feb. 16, 1993

[54] AUTOMOTIVE POWER STEERING GEAR

[75] Inventor: Richard H. Smith, Birmingham, Mich.

[73] Assignee: General Motors Corporation, Detroit, Mich.

[21] Appl. No.: 720,567

[22] Filed: Jun. 25, 1991

[51] Int. Cl.5 .................................................. B62D 5/083
[52] U.S. Cl. ........................................ 180/132; 180/146; 180/148; 91/436
[58] Field of Search ................ 180/132, 146, 147, 148, 180/136, 141, 142, 143, 149; 60/384, 401, 463; 91/375 R, 374, 467, 375 A, 436

[56] References Cited

U.S. PATENT DOCUMENTS

| | | | |
|---|---|---|---|
| 4,367,803 | 1/1983 | Wittren | 180/153 |
| 4,405,030 | 9/1983 | Wittren | 180/153 |
| 4,558,759 | 12/1985 | Baatrup et al. | 180/132 |
| 4,768,604 | 9/1988 | Schipper | 180/143 |
| 4,774,807 | 10/1988 | Pedersen | 60/384 |
| 4,830,131 | 5/1989 | Miyoshi et al. | 180/141 |

FOREIGN PATENT DOCUMENTS

| | | | |
|---|---|---|---|
| 2341207 | 2/1975 | Fed. Rep. of Germany | 180/132 |
| 0141964 | 8/1983 | Japan | 180/132 |

Primary Examiner—Charles A. Marmor
Assistant Examiner—Jeffrey A. Kuta
Attorney, Agent, or Firm—Saul Schwartz

[57] ABSTRACT

An automotive power steering gear having a four-way, open-center valve defining inlet branch passages between an inlet port of the steering gear and opposite working chambers of a steering assist fluid motor and further defining discharge branch passages between the opposite fluid motor working chambers and a discharge port of the steering gear. Lands and grooves on a spool and a sleeve of the valve define variable orifices in the inlet and discharge branch passages. The steering gear further includes bypass passages around each of the variable orifices in the inlet branch passages and check valves in the bypass passages which open the passages only when the pressure in the corresponding one of the fluid motor working chambers exceeds the pressure at the inlet port. When one or the other of the check valves is open, fluid recirculates from one of the fluid motor working chambers to the other.

3 Claims, 3 Drawing Sheets

AUTOMOTIVE POWER STEERING GEAR

FIELD OF THE INVENTION

This invention relates to automotive power steering gears.

BACKGROUND OF THE INVENTION

In conventional rotary valve power steering gears such as described in U.S. Pat. No. 3,022,772, issued Feb. 27, 1962 and assigned to the assignee of this invention, a torsion bar between an input shaft of the gear and an output shaft of the gear simulates road feel when a driver turns a steering wheel connected to the input shaft. A four-way, open-center, rotary valve of the gear includes a spool on the input shaft and a sleeve on the output shaft which cooperate, when the spool rotates relative to the sleeve, to port a first or pressure chamber of a steering assist fluid motor to a pump and a second or exhaust chamber of the fluid motor to a reservoir.

Usually, the rate at which the pressure chamber of the fluid motor expands is the regulated discharge flow rate of the pump. When the steering wheel of the vehicle is turned very rapidly, however, as in an evasive maneuver, mechanical limit stops on the input and output shafts may engage to effect a direct mechanical connection between the input and output shafts. Thereafter, if the high steering wheel turning rate is sustained, the pressure chamber of the fluid motor may be manually over-expanded and the discharge chamber over-compressed. In that circumstance, a partial vacuum may develop in the pressure chamber and over-pressure may be induced the discharge chamber which may increase the manual effort required to sustain the turning rate of the steering wheel. The same result may obtain even without engagement of the limit stops where the steering wheel is turned very rapidly under conditions of low steering resistance such as driving at highway speed or on a slippery road surface where the torsion bar provides sufficient force to move the rack.

SUMMARY OF THE INVENTION

This invention is a new and improved power steering gear of the type having an input shaft, an output shaft, and a four-way control valve which defines a pair of inlet branch passages from an inlet port of the steering gear to each working chamber of a steering assist fluid motor and a pair of discharge branch passages from a discharge port of the steering gear to each working chamber of the fluid motor. The inlet port is connected to a pump and the discharge port is connected to a reservoir. The four-way valve has relatively movable valve elements defining variable orifices in the inlet and discharge branch passages which orifices, when the valve elements move relative to each other, connect only one working chamber at a time to the inlet port and to the discharge port.

The steering gear according to this invention further includes a pair of bypass passages parallel to the inlet branch passages and a pair of check valves in respective ones of the bypass passages which permit fluid flow only opposite the flow in the inlet branch passages. During typical steering maneuvers, the pressure at the inlet port is the highest pressure in the steering gear and reacts on both check valves in a closing direction so that there is no flow in the bypass passages. When the steering wheel is turned at a rate which induces over-expansion of the pressure chamber and over-compression of the discharge chamber, the pressure gradient reverses across the check valve in communication with the discharge chamber so that fluid recirculates from the discharge chamber to the inlet port and from the inlet port through the open one of the inlet branch passages to the pressure chamber to relieve the partial vacuum in the pressure chamber and to relieve over-pressure in the discharge chamber.

DESCRIPTION OF A PREFERRED EMBODIMENT

Figure 1:
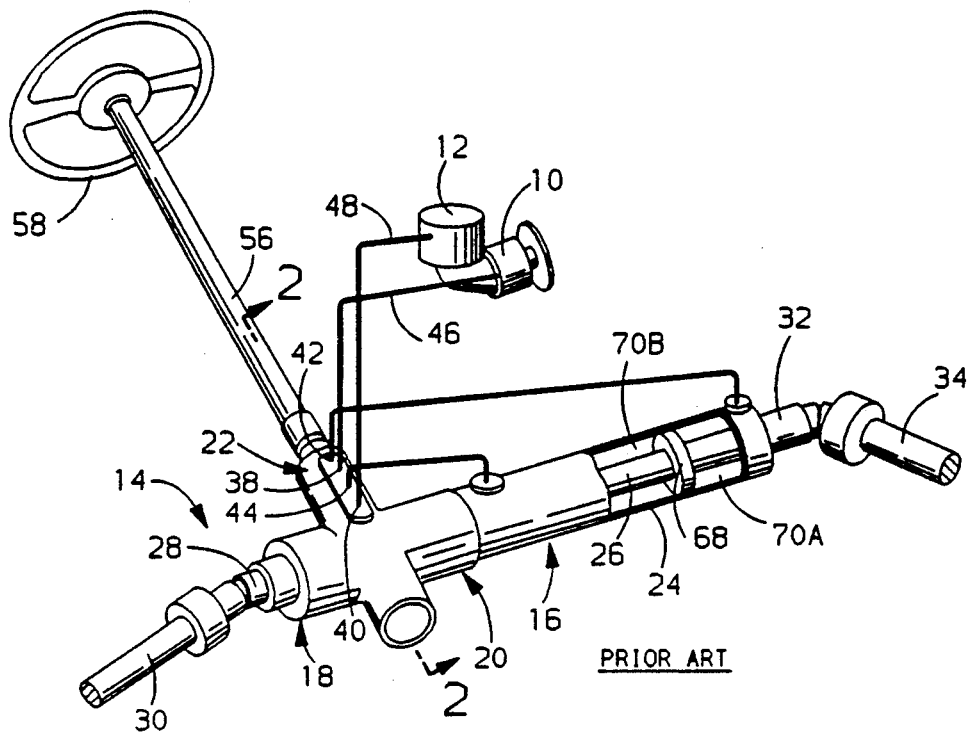
FIG. 1 is a partially broken-away perspective view of a typical automotive power steering system.

Referring to FIGS. 1-4, a typical automotive power steering system includes a pump (10), a reservoir (12), a rack and pinion power steering gear (14), and a steering assist fluid motor (16). The steering gear (14) includes a housing (18) adapted for rigid attachment to a vehicle, not shown. The housing (18) includes a tubular rack housing (20) and a tubular valve housing (22) integral with the rack housing. A tubular fluid motor housing (24) of the fluid motor (16) is attached to one end of the rack housing.

A steering rack (26) is slidably disposed in the rack housing (20) and extends through the fluid motor housing (24). A first end (28) of the rack is connected to one of the steered wheels of the vehicle through a tie rod end (30). A second end (32) of the rack is connected to the other of the steered wheels of the vehicle through a tie rod end (34). Back and forth movement of the steering rack in its length direction steers the front wheels of the vehicle in the usual fashion.

The valve housing (22) has a cylindrical valve chamber (36) therein, an inlet port (38), a discharge port (40), a first working chamber port (42), and a second working chamber port (44). The inlet port (38) is connected by a tube (46) to the discharge of power steering pump (10). A representative power steering pump is described in U.S. Pat. No. 3207077 issued Sep. 21, 1965 and assigned to the assignee of this invention. The discharge port (40) is connected to the reservoir (12) by a tube (48).

The steering gear (14) further includes an input or stub shaft (50) supported on the valve housing in the valve chamber (36) for rotation about an axis (52) of the valve housing. An outboard end (54) of the stub shaft outside the valve housing is connected to a steering shaft (56) for rotation as a unit with the steering shaft and with a manual steering wheel (58) at the other end of the steering shaft. An inboard end (60) of the stub shaft inside the valve housing is rotatably supported on an output shaft or pinion head (62) of the steering gear.

The pinion head is supported on the valve housing (22) for rotation about the axis (52) independent of the stub shaft and has a pinion gear (64) thereon which meshes with a plurality of rack teeth (66) on the steering rack (26). Limit stops, not shown, on the pinion head and on the stub shaft restrict total relative angular movement between the stub shaft and pinion head to a predetermined angular interval of on the order of 7.0 degrees. Steering gears described in U.S. Pat. Nos. 3,022,772 and 4,454,801, issued Feb. 27, 1962 and Jun. 19, 1984, respectively, and assigned to the assignee of this invention, include representative limit stops.

A piston (68) on the steering rack (26) inside the fluid motor housing (24) defines the reaction member of the fluid motor (16). The opposite ends of the fluid motor housing (24) are sealed around the rack (26) so that a first variable volume fluid motor working chamber (70A) is defined on one side of the piston (68) and a second variable volume fluid motor working chamber (70B) is defined on the other side of the piston (68).

Figure 3:
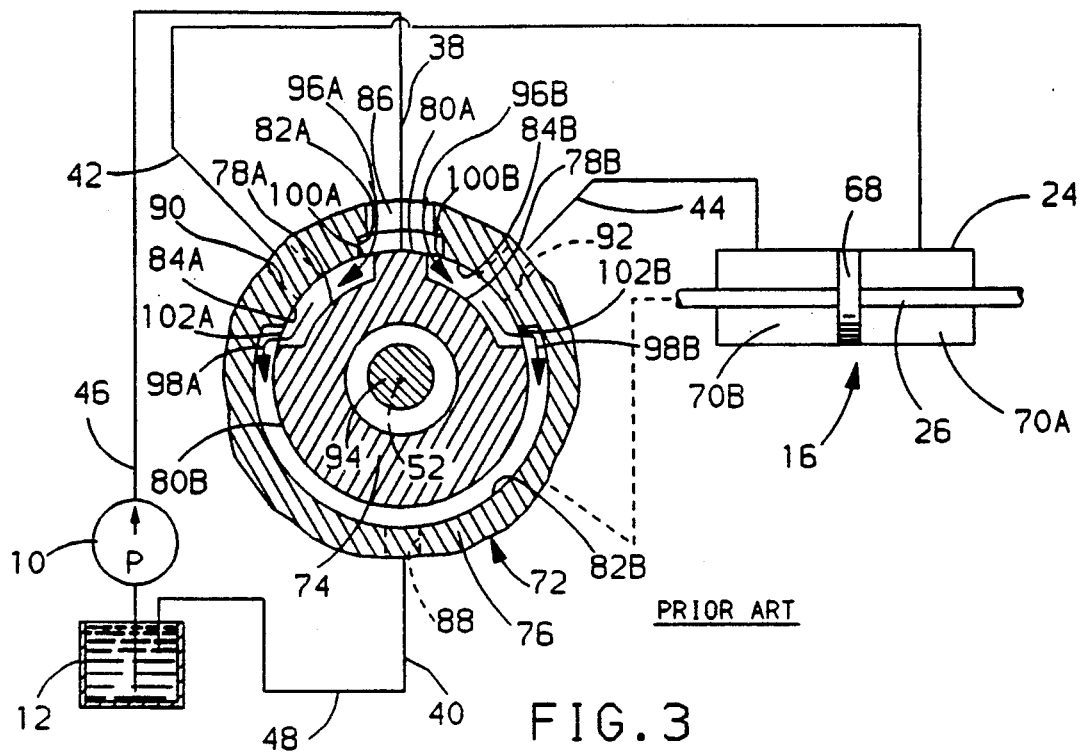
FIG. 3 is a schematic sectional view taken generally along the plane indicated by lines 3—3 in FIG. 2.

A conventional four-way, open-center rotary valve (72) is disposed in the valve chamber (36) and controls distribution of fluid between the pump (10), the working chambers (70A-B), and the reservoir (12). For simplicity, only a single set of lands, grooves, and orifices of the four-way valve is illustrated in FIG. 3. Representative valves with multiple sets of lands, grooves, and orifices are described in the aforesaid U.S. Pat. Nos. 3,022,772 and 4,454,801. In addition, it is understood that the steering gear (14) could incorporate a linear, four-way, open-center valve functionally identical to the rotary valve (72).

Figure 2:
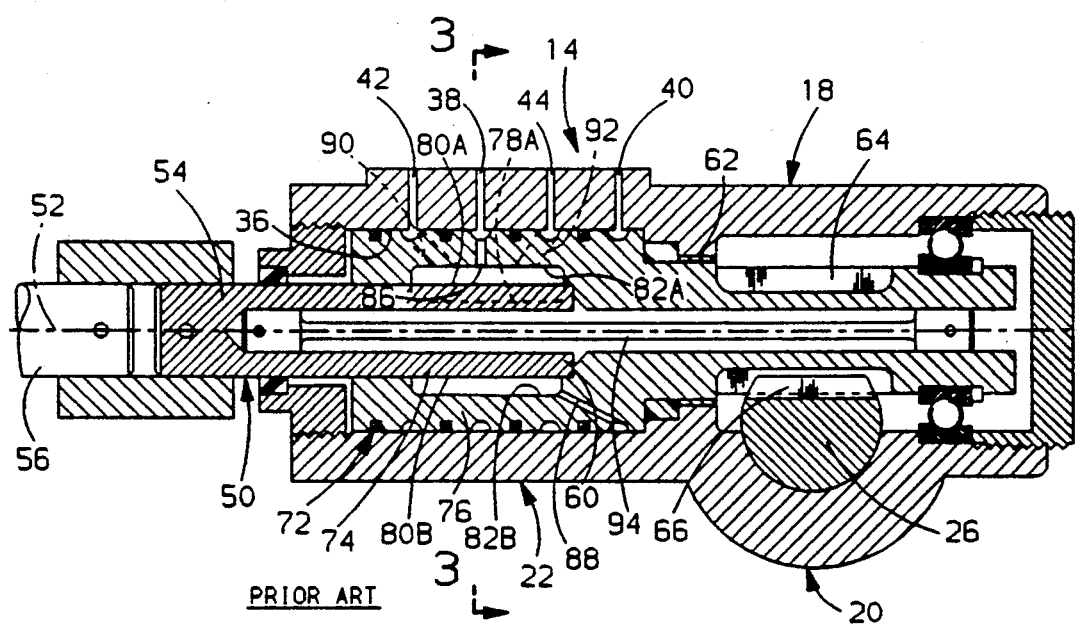
FIG. 2 is a sectional view taken generally along the plane indicated by lines 2—2 in FIG. 1.
Figure 4:
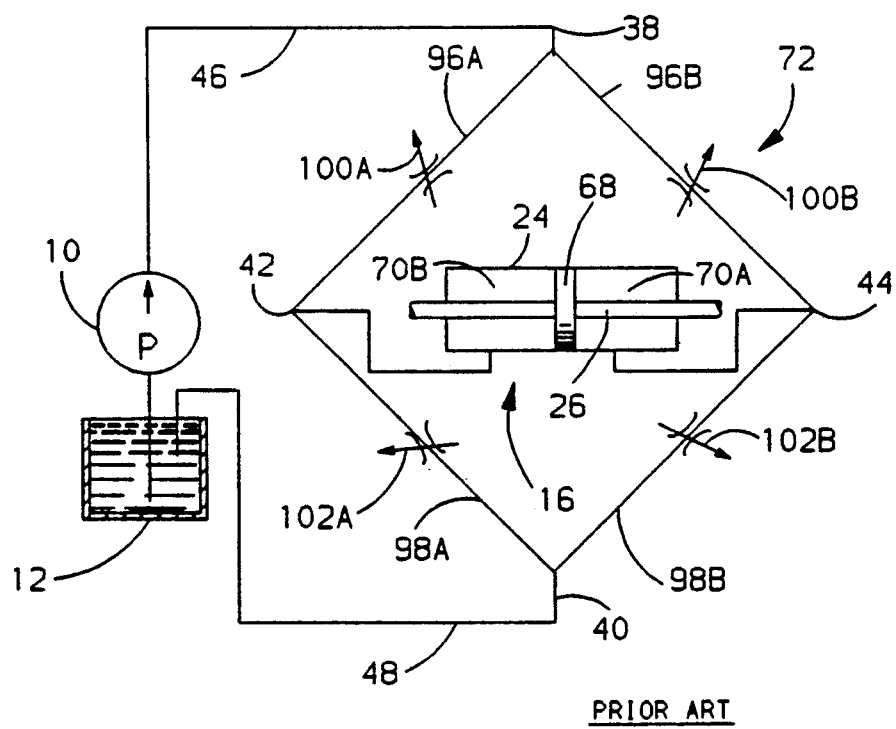
FIG. 4 is a schematic diagram of the power steering system illustrated in FIG. 1.

With particular reference to FIGS. 2–4, the four-way valve (72) includes a spool (74) integral with the stub shaft (50) near the inboard end of the latter and a sleeve (76) defined by the portion of the pinion head surrounding the spool. The spool has a pair of closed-ended grooves (78A-B) facing the sleeve separated by a pair of lands (80A-B) of the same outside diameter as the spool. The sleeve has a pair of closed ended grooves (82A-B) facing the lands (80A-B), respectively, on the spool. The grooves (82A-B) on the sleeve are separated by a pair of lands (84A-B) of the same inside diameter as the sleeve and facing the grooves (78A-B), respectively, on the spool.

The inlet port (38) communicates with the sleeve groove (82A) through a radial passage (86). The discharge port (40) communicates with the sleeve groove (82B) through a radial passage (88). The first working chamber port (42) communicates with the inside diameter of the sleeve (76) through a radial passage (90) in the sleeve land (84A). The second working chamber port (44) communicates with the inside diameter of the sleeve (76) through a radial passage (92) in the sleeve land (84B).

A torsion bar (94) between the pinion head and the stub shaft defines an open-center position of the spool (74), FIG. 3, relative to the sleeve (76) and resists relative rotation between the stub shaft and pinion head. In the open-center position of the spool (74), the spool lands (80A-B) face the sleeve grooves (82A-B) and the spool grooves (78A-B) face the sleeve lands (84A-B). The sleeve grooves (82A-B) overlap the spool lands (80A-B) so that in the open-center position of the spool, a pair of inlet branch passages represented by flow arrows (96A-B) are defined from the inlet port (38) to the working chamber ports (42-44), respectively, and a pair of discharge branch passages represented by flow arrows (98A-B) are defined from the working chamber ports (42-44), respectively, to the discharge port (40).

The adjacent edges of the spool land (80A) and the sleeve groove (82A) define a first pair of variable orifices (100A-B) in the inlet branch passages (96A-B). Similarly, the adjacent edges of the spool land (80B) and the sleeve groove (82B) define a pair of variable orifices (102A-B) in the discharge branch passages (98A-B). In well known fashion, when the stub shaft (50) rotates relative to the pinion head and displaces the spool (74) from its open-center position, a first one of the working chambers (70A-B), i.e. the pressure chamber, is connected to the inlet port (38) through an open one of the orifices (100A-B) and a second one of the working chambers (70A-B), i.e. the discharge chamber, is connected to the discharge port (40) through an open one of the orifices (102A-B). The other orifice in each pair of orifices (100A-B) and (102A-B) close so that only the pressure chamber is connected to the pump and only the discharge chamber is connected to the reservoir.

As the fluid motor (16) steers the front wheels of the vehicle, the sleeve (76) rotates in the same direction as the spool (74) due to its mechanical connection to the steering rack (26) through the pinion head (62) and pinion gear (64). The rate at which the pump (10) expands the pressure chamber of the fluid motor during steering assist, and therefore the rate at which the valve sleeve follows the valve spool, is usually sufficient to maintain the relative angular interval between the stub shaft (50) and pinion head (62) in the range in which the limit stops on the stub shaft and pinion head are not engaged.

If the turning rate of the steering wheel (58) is high, as in an evasive maneuver, the pump may not expand the pressure chamber at a rate sufficient to prevent the limit stops from engaging. In that circumstance, the pressure chamber may be manually over-expanded, the discharge chamber may be manually over-compressed, and the manual effort at the steering wheel (58) required to sustain the high turning rate may increase. The same thing happens even if the limit stops are not engaged if the steering wheel is turned rapidly and the resistance to steering of the front wheels is low such as when the vehicle is moving at highway speed or is driven on a slippery road surface where the torsion bar provides sufficient force to move the rack.

Figure 5:
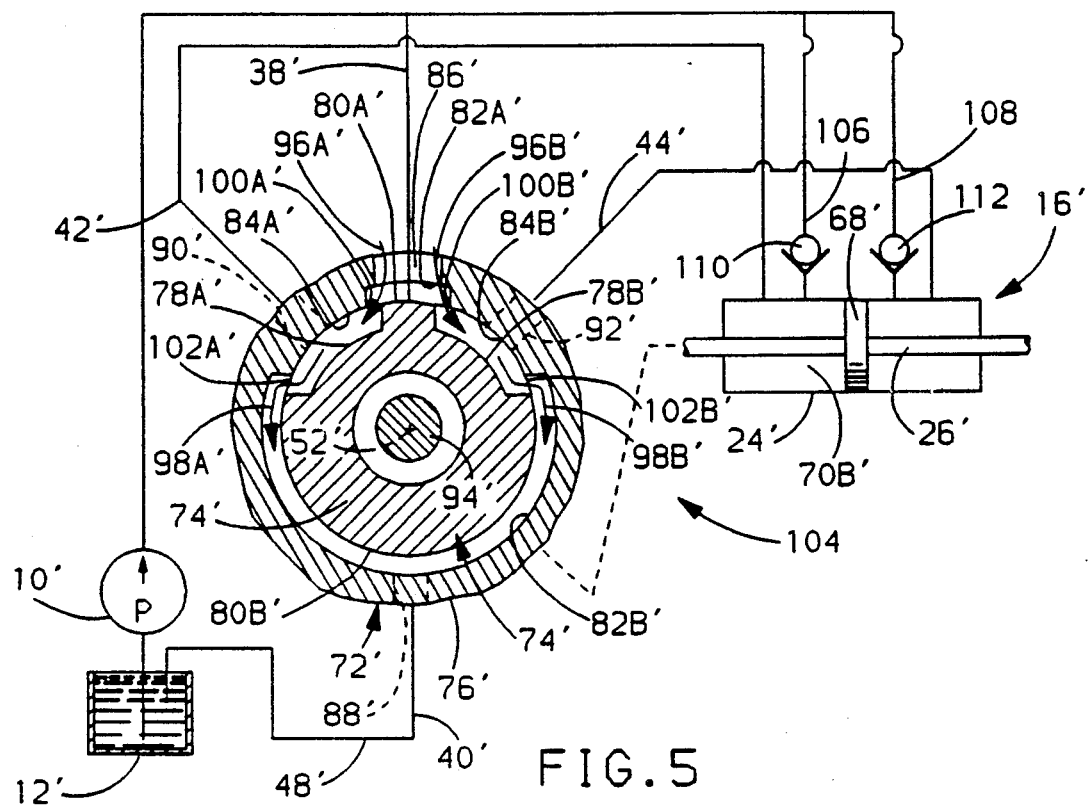
FIG. 5 is similar to FIG. 3 but showing a power steering gear according to this invention.
Figure 6:
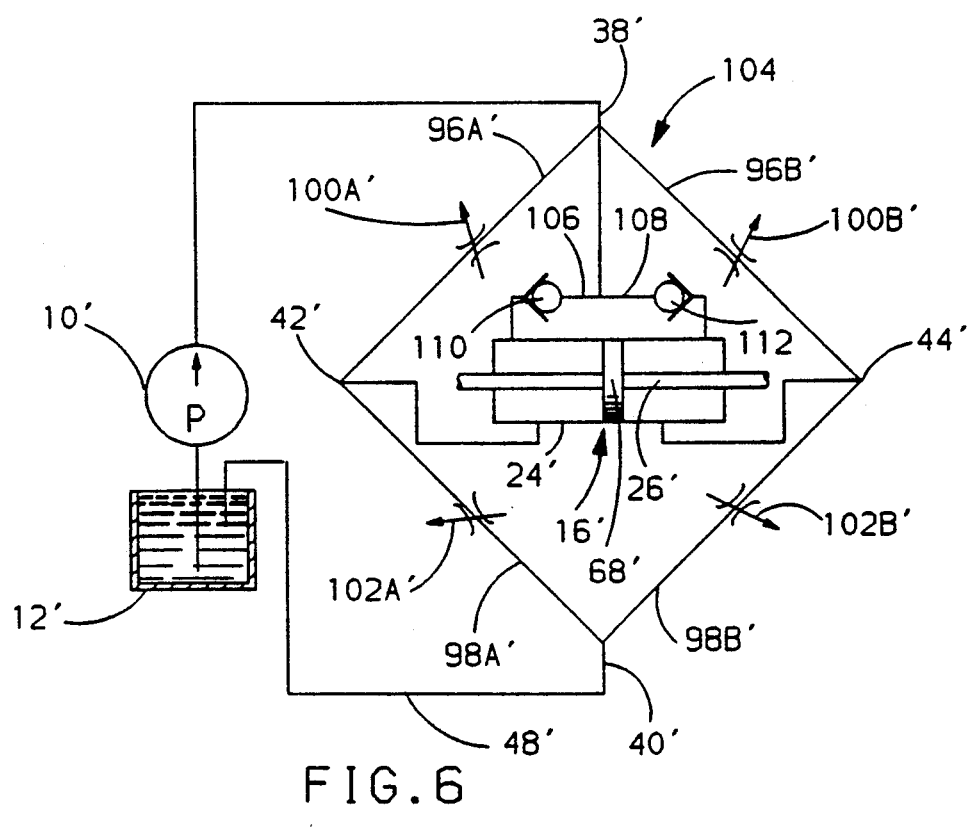
FIG. 6 is similar to FIG. 4 but illustrating a power steering system including a power steering gear according to this invention.

A steering gear (104) according to this invention is illustrated in FIGS. 5-6 wherein structural elements common to the steering gear (14) described above are identified by primed reference characters. The steering gear (104) according to this invention includes a four-way, open-center valve (72'). The valve defines a pair of inlet branch passages (96A'-B') between an inlet port (38') of the gear and a pair of working chamber ports (42',44') connected to working chambers (24',26') of a fluid motor (16'). The valve further defines a pair of discharge branch passages (98A'-B') between the working chamber ports (42',44') and a discharge port (40') of the gear. A plurality of lands and grooves (80A'-B',78A'-B') on a spool (74') of the four-way valve (72') cooperate as described above with a plurality of lands and grooves (84A'-B',82A'-B') on a sleeve 76' of the four-way valve in defining a pair of variable orifices (100A'-B') in the inlet branch passages (96A'-B') and a pair of variable orifices (102A'-B') in the discharge branch passages (98A'-B').

The steering gear (104) according to this invention further includes a first bypass passage (106) around the variable orifice (100A') between the inlet port (38') and the working chamber (24') of the fluid motor and a second bypass passage (108) around the variable orifice (100B') between the inlet port (38') and the other working chamber (26') of the fluid motor. A first check valve (110) is disposed in the first bypass passage (106) and a second check valve (112) is disposed in the second bypass passage (108). The check valves (110-112) permit fluid flow only in the direction opposite the flow in the inlet branch passages (96A'-B'), i.e. from the working chambers (24'-26') to the inlet port (38') upstream of the variable orifices (100A'-B').

In the various operating regimes of the steering gear (104) associated with usual driving conditions, the check valves (110-112) are closed. For example, when the spool (74') is in its open center position, all of the orifices (100A'-B',102A'-B') are open and fluid circulates through both inlet branch passages (96A'-B') and through both discharge branch passages (98A'-B') from the pump (10) to the reservoir (12'). The pressure at the inlet port (38') is the highest in the steering gear due to pressure drops across the orifices (100A'-B',102A'-B') and reacts against the check valves (110-112) through the bypass passages (106-108) to maintain the check valves closed. When the input shaft is rotated relative the output shaft, even up to the maximum interval permitted by the limit stops on the stub shaft and pinion head, the small sizes of the orifices still induce pressure drops so that the pressure at the inlet port (38') remains the highest pressure in the steering gear and the check valves (110-112) stay closed.

In the above described operating regime of the steering gear characterized by over-expansion of the fluid motor pressure chamber and over-compression of the fluid motor discharge chamber, one of the check valves (110-112) opens to relieve partial vacuum in the fluid pressure chamber and over-pressure in the fluid motor discharge chamber. For example, in the clockwise direction of rotation of the stub shaft and the valve spool (74'), FIG. 5, the orifices (100A' and 102B') open maximum, the orifices (100B' and 102A') fully close, manually induced partial vacuum develops in fluid motor pressure chamber (24'), and manually induced over-pressure develops in fluid motor discharge chamber (26'). In that circumstance, the check valve (112) opens because over-pressure in the discharge chamber (26') exceeds the pressure at the inlet port (38'). When the check valve (112) opens, fluid recirculates from the discharge chamber (26') to the inlet port (38') upstream of the orifice (100A'), and then to the pressure chamber (24') through the orifice (100A') to relieve the partial vacuum in the pressure chamber and over-pressure in the discharge chamber.

I claim:

1. In a power steering system including
   a steering assist fluid motor having a movable reaction member defining a first variable volume working chamber on one side of said reaction member and a second variable volume working chamber on the other side of said reaction member,
   a power steering gear comprising:
   a housing having an inlet port for connection to a fluid pump and a discharge port for connection to a reservoir and a first working chamber port for connection to said first fluid motor working chamber and a second working chamber port for connection to said second fluid motor working chamber,
   an input shaft rotatably supported on said housing and connected to a steering wheel,
   an output shaft rotatably supported on said housing and connected to said fluid motor reaction member,
   an open-center control valve in said housing defining a pair of inlet branch passages from said inlet port to respective ones of said first and said second working chamber ports and a pair of discharge branch passages from respective ones of said first and said second working chamber ports to said discharge port and including land and groove means connected to said input shaft and said output shaft defining a variable orifice in each of said inlet branch passages and said discharge branch passages,
   means on said housing defining a first bypass passage around said variable orifice in said first inlet branch passage,
   means on said housing defining a second bypass passage around said variable orifice in said second inlet branch passage,
   first valve means in said first bypass passage responsive to a pressure gradient between said inlet port and said first fluid motor working chamber operative to open said first bypass passage only when the pressure in said first fluid motor working chamber exceeds the pressure at said inlet port, and
   second valve means in said second bypass passage responsive to a pressure gradient between said inlet port and said second fluid motor working chamber operative to open said second bypass passage only when the pressure in said second fluid motor working chamber exceeds the pressure at said inlet port.

2. The power steering gear recited in claim 1 wherein said first valve means is a first check valve in said first bypass passages and said second valve means is a second check valve in said second bypass passage.

3. The steering gear recited in claim 2 wherein said open-center valve is a rotary valve including a valve spool connected to said input shaft and a valve sleeve connected to said output shaft.

* * * * *